US011140027B2

(12) United States Patent
Nicholson et al.

(10) Patent No.: US 11,140,027 B2
(45) Date of Patent: Oct. 5, 2021

(54) INTEGRATATION OF INTERNET OF THINGS DEVICE INTO NETWORK

(71) Applicant: Lenovo (Singapore) Pte. Ltd., Singapore (SG)

(72) Inventors: John Weldon Nicholson, Cary, NC (US); Daryl C. Cromer, Raleigh, NC (US); Howard Jeffrey Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 3 days.

(21) Appl. No.: 16/587,830

(22) Filed: Sep. 30, 2019

(65) Prior Publication Data

US 2021/0099340 A1 Apr. 1, 2021

(51) Int. Cl.
*G06F 15/177* (2006.01)
*H04L 12/24* (2006.01)
*H04W 4/80* (2018.01)
*H04L 29/08* (2006.01)
*H05B 47/19* (2020.01)

(52) U.S. Cl.
CPC ........ *H04L 41/0806* (2013.01); *H04L 41/084* (2013.01); *H04L 67/12* (2013.01); *H04W 4/80* (2018.02); *H05B 47/19* (2020.01)

(58) Field of Classification Search
CPC ... H04L 41/0806; H04L 67/12; H04L 41/084; H05B 47/19; H04W 4/80
See application file for complete search history.

(56) References Cited

U.S. PATENT DOCUMENTS

| 7,827,394 | B2 | 11/2010 | Brown et al. |
| 2003/0120827 | A1 | 6/2003 | Fulginiti et al. |
| 2005/0097503 | A1 | 5/2005 | Zintel et al. |
| 2006/0190575 | A1 | 8/2006 | Harvey et al. |
| 2007/0288662 | A1 | 12/2007 | Chen |
| 2008/0130517 | A1 | 6/2008 | Lee et al. |

(Continued)

FOREIGN PATENT DOCUMENTS

| CN | 101030867 A | 9/2007 |
| CN | 102073513 A | 5/2011 |

OTHER PUBLICATIONS

Peterson et al., "Service Processor for Configuring Servers Joining Peer to Peer Network", Board Decision from related U.S. Appl. No. 14/100,738 dated Feb. 3, 2020.

(Continued)

*Primary Examiner* — Suraj M Joshi
*Assistant Examiner* — Jaren Means
(74) *Attorney, Agent, or Firm* — John M. Rogitz; John L. Rogitz

(57) ABSTRACT

In one aspect, a first Internet of Things (IoT) device includes at least one processor and storage accessible to the at least one processor. The storage includes instructions executable by the at least one processor to transmit a request related to one or more first settings to apply at the first IoT device, where the request transmitted using wireless communication other than Wi-Fi/Internet communication. The instructions are also executable to receive data indicating one or more second settings applied at a second IoT device using the wireless communication and to apply the one or more first settings at the first IoT device based on the received data.

20 Claims, 7 Drawing Sheets

(56) References Cited

U.S. PATENT DOCUMENTS

| | | |
|---|---|---|
| 2008/0263190 A1 | 10/2008 | Serizawa et al. |
| 2009/0073896 A1 | 3/2009 | Gillingham et al. |
| 2009/0228649 A1 | 9/2009 | Porel et al. |
| 2009/0282328 A1 | 11/2009 | Olsen et al. |
| 2012/0278455 A1 | 11/2012 | Peng et al. |
| 2013/0132553 A1 | 5/2013 | Stratton et al. |
| 2014/0126410 A1 | 5/2014 | Agarwal et al. |
| 2015/0163294 A1 | 6/2015 | Peterson et al. |
| 2017/0099352 A1* | 4/2017 | Baughman .............. H04L 67/12 |
| 2019/0114061 A1* | 4/2019 | Daniels .................. G06F 3/048 |
| 2019/0182649 A1* | 6/2019 | Best ........................ H04L 67/26 |
| 2019/0349426 A1* | 11/2019 | Smith ................. G06F 16/1824 |

OTHER PUBLICATIONS

Peterson et al., "Service Processor for Configuring Servers Joining Peer to Peer Network", file history of related U.S. Appl. No. 14/100,738, filed Dec. 9, 2013.

* cited by examiner

| PARAMETER | BULB(S) | WINDOW SHADE(S) | TIME(S) |
|---|---|---|---|
| YELLOW COLOR | YELLOW | OPEN | SUN UP TO SUN DOWN |
| BLUE COLOR | BLUE | CLOSED | 7:01 P.M. TO 6:59 A.M. |
| EVENING LIGHTING | ON | OPEN IF HALF TO FULL MOON OCCURRING | 8:00 P.M. TO 5:00 A.M. |
| AMBIENT BRIGHTNESS LEVEL 5 | DYNAMIC (USE AMBIENT LIGHT SENSOR) | DYNAMIC (USE AMBIENT LIGHT SENSOR) | ALL DAY |

700 ↘

| PARAMETER | BLUETOOTH SPEAKERS | TV SPEAKERS |
|---|---|---|
| VOLUME | 5 | 0 |
| VOLUME | N/A | 6 |
| TREBLE | +5 | +5 |

LIGHTING/BULB PREFERENCES

COLOR:
- WHITE  *802*
- YELLOW
- OTHER  ~*804*

*806* BULB BRIGHTNESS: ☐ (CHOSE 0 TO 10)

*808*

*810* TIME(S) ON: ☐ TO ☐

*812*  *814*

*816* ■ APPLY TO NEW BULBS WHEN THEY COME ONLINE

FIG. 8

INTEGRATATION OF INTERNET OF THINGS DEVICE INTO NETWORK

FIELD

The present application relates to technically inventive, non-routine solutions that are necessarily rooted in computer technology and that produce concrete technical improvements. In particular, the present application relates to integration of an Internet of things (IoT) device into a network.

BACKGROUND

As recognized herein, currently many Internet of things (IoT) devices join a home network or other network and are configured with the aid of a server using an Internet connection. As also recognized herein, using a server and the Internet to do so can lead to the home network being compromised and possibly attacked with malware and other computer viruses. This in turn may cause many undesired consequences, such as inoperability or malfunctioning of the devices connected to the network, takeover of a device for denial of service attacks, and personal data stored on the network being compromised. For example, the Simple Service Discovery Protocol (SSDP) has been subject to much exploitation by hackers in recent years. There are currently no adequate solutions to the foregoing computer-related, technological problem related to device security in Internet of things networks.

SUMMARY

Accordingly, in one aspect an apparatus includes at least one processor and storage accessible to the at least one processor. The storage includes instructions executable by the at least one processor to identify a first Internet of things (IoT) device as being connected to a network and to, responsive to the identification, transmit data to the first IoT device for integration of the first IoT device into the network. The data indicates one or more settings already applied at a second IoT device different from the first IoT device, and the data is transmitted at least in part using non-Internet communication.

In some examples, the first IoT device may be a same device type as the second IoT device. The data may be transmitted peer-to-peer to the first IoT device using wireless Bluetooth communication and/or wireless Zigbee communication. Additionally, the first IoT device being connected to the network may be identified based at least in part on receipt at the apparatus of a wireless signal from the first IoT device that requests settings configuration data.

In some embodiments, the apparatus may communicate with both the first IoT device and the second IoT device to control operation of both the first IoT device and the second IoT device. In other embodiments, the apparatus may include the second IoT device and the second IoT device may transmit the data to the first IoT device via peer-to-peer wireless communication and without having to communicate with any other device.

Also in some embodiments, integration of the first IoT device into the network may include configuring the first IoT device to operate the same as the second IoT device has already been configured to operate. Thus, in examples where the first and second IoT devices include respective first and second smart light bulbs, the configuring of the first IoT device to operate the same as the second IoT device may include configuring the first smart light bulb to operate at a same brightness level as the second smart light bulb, configuring the first smart light bulb to operate using a same color as the second smart light bulb, and/or configuring the first smart light bulb to operate at the same respective time(s) as the second smart light bulb has been configured to operate.

In another aspect, a method includes identifying a first Internet of things (IoT) device as being connected to a network and, responsive to the identifying, transmitting data to the first IoT device that indicates one or more settings already applied at a second IoT device different from the first IoT device. The data is transmitted at least in part using non-Internet communication.

In some embodiments, the first IoT device may be a same device type as the second IoT device. As an example, the same device type may be a smart light bulb.

However, in other embodiments the first IoT device may be a different device type than the second IoT device. In these embodiments, the one or more settings may be one or more first settings, and the data may be used to determine one or more second settings for operation of the first IoT device complimentary with operation of the second IoT device. The one or more second settings for operation of the first IoT device complimentary with operation of the second IoT device may be determined based on accessing data in a relational database indicating complimentary settings.

In another aspect, a first Internet of Things (IoT) device includes at least one processor and storage accessible to the at least one processor. The storage includes instructions executable by the at least one processor to transmit a peer-to-peer request related to one or more first settings to apply at the first IoT device, where the peer-to-peer request is transmitted using wireless communication other than Wi-Fi communication. The instructions are also executable to receive data indicating one or more second settings applied at a second IoT device, where the data is received using the wireless communication other than Wi-Fi communication. Still further, the instructions are executable to apply the one or more first settings at the first IoT device based on the received data.

In some examples, the data may be received from the second IoT device. Also in some examples, the one or more first settings and the one or more second settings may both include at least one setting common to both the one or more first settings and the one or more second settings, with the one or more first settings and the one or more second settings not being identical.

The details of present principles, both as to their structure and operation, can best be understood in reference to the accompanying drawings, in which like reference numerals refer to like parts, and in which:

BRIEF DESCRIPTION OF THE DRAWINGS

FIGS. 4 and 5 show example algorithms that may be executed by existing and new IoT devices of a network, respectively, consistent with present principles;

FIGS. 6 and 7 show example illustrations of relational databases that may be used consistent with present principles; and FIGS. 8 and 9 show example graphical user interfaces (GUIs) that may be presented on electronic displays for configuring various settings related to IoT device operation consistent with present principles.

DETAILED DESCRIPTION

Figure 1:
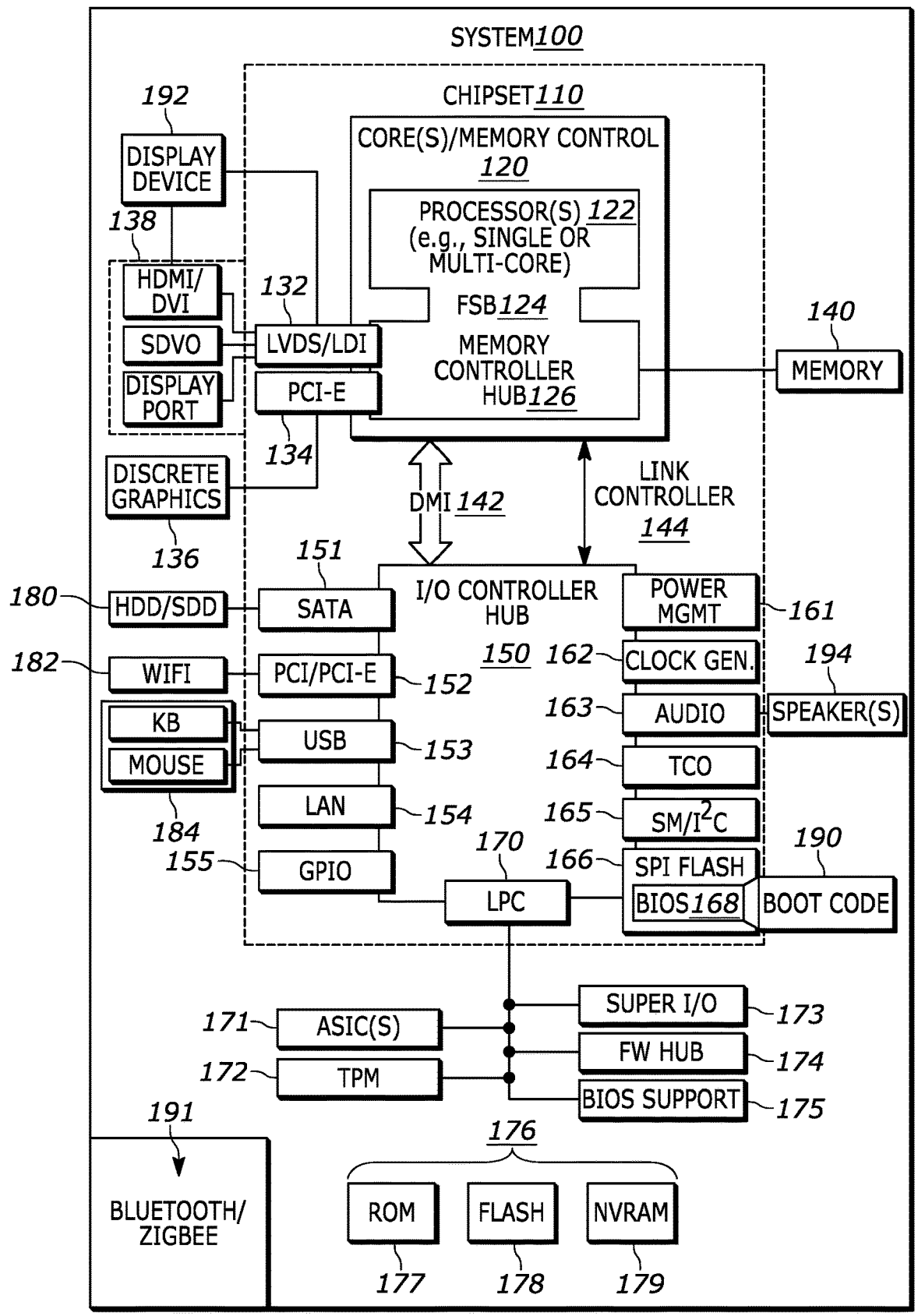
FIG. 1 is a block diagram of an example system consistent with present principles.

The present application relates to configuring similar or complimentary new Internet of things (IoT) devices when they join a network based on settings already configured for another IoT device. IoT devices consistent with present principles may include, for example, devices other than traditional computing devices such as laptop computers, desktop computers, tablet computers, smart phones, wearable devices, and servers. Thus, example IoT devices may include smart light bulbs, smart window shades, smart ovens and other smart kitchen appliances, etc.

The new and existing IoT devices may communicate for such purposes using peer-to-peer, non-Internet/non-Wi-Fi communication, such as Zigbee or Bluetooth communication. Thus, on initial installation of a new IoT device, the new IoT device may send out a peer-to-peer configuration request to any devices that are within range of the new IoT device. Similar devices that can receive the request may then broadcast their respective configuration information back to the newly-connected IoT device. As examples, when Zigbee or Bluetooth communication are used for such purposes, owing to both those communication types establishing short-range personal area networks, communication between IoT devices may be limited to devices within the same location. Other peer-to-peer personal area network types may also be used, including certain radio frequency-based protocols.

As an example, consider smart light bulbs. A person might dispose many of these bulbs in one room to help light the room. The user may program them to turn on/off at certain times, and the user may also be allowed to pick the color and brightness of light emitted by the bulbs. The user may also set up routines for when the bulbs are to operate, such as operating according to a first set of settings when the user is watching television and operating according to a second set of settings when the user is reading a book. After these preferences have been configured for existing smart light bulbs already connected to the network, each additional bulb the user might install or replace after that point may inherit all the settings of the existing bulbs that have already been configured.

Prior to delving into the details of the instant techniques, with respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include one or more non-Internet/non-Wi-Fi transceivers 191 for use consistent with present principles, such as a Bluetooth transceiver for classic Bluetooth and/or Bluetooth low energy (BLE) communication using Bluetooth communication protocols. The transceiver(s) 191 may also include a Zigbee or other radio frequency (RF) transceiver for communicating with other devices consistent with present principles using Zigbee or other RF protocols.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
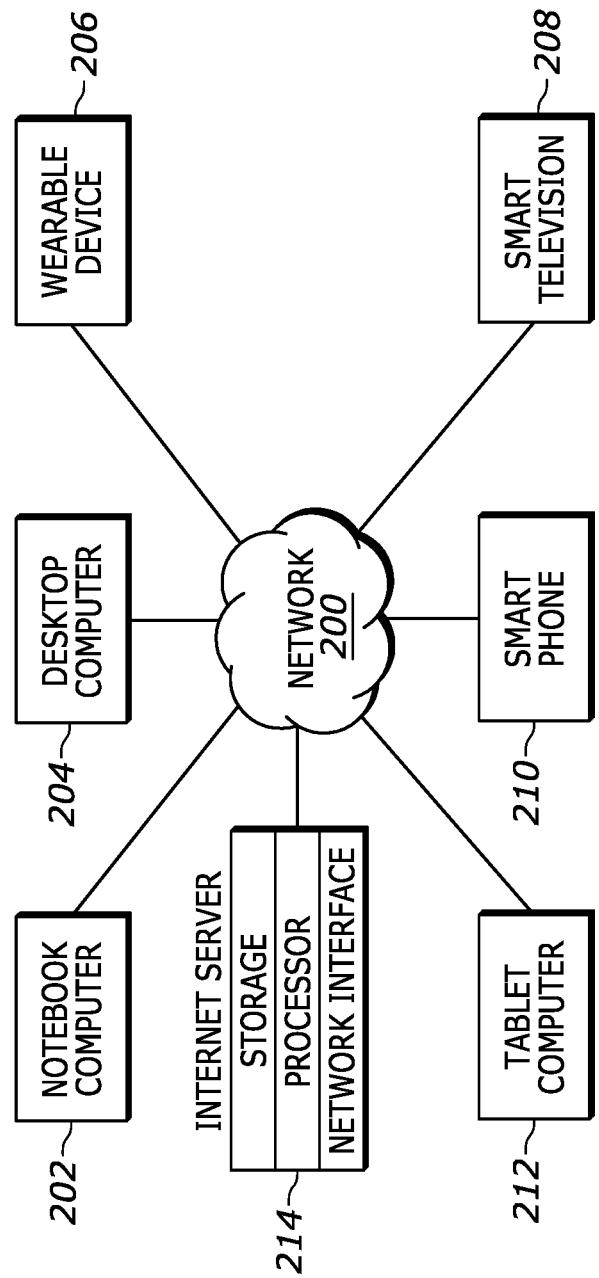
FIG. 2 is a block diagram of an example network of devices consistent with present principles.

Turning now to FIG. 2, example devices are shown communicating over a network 200 in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 that may provide storage accessible to the devices 202-212. It is to be understood that the devices 202-214 are configured to communicate with each other over the network 200 to undertake present principles.

Figure 3:
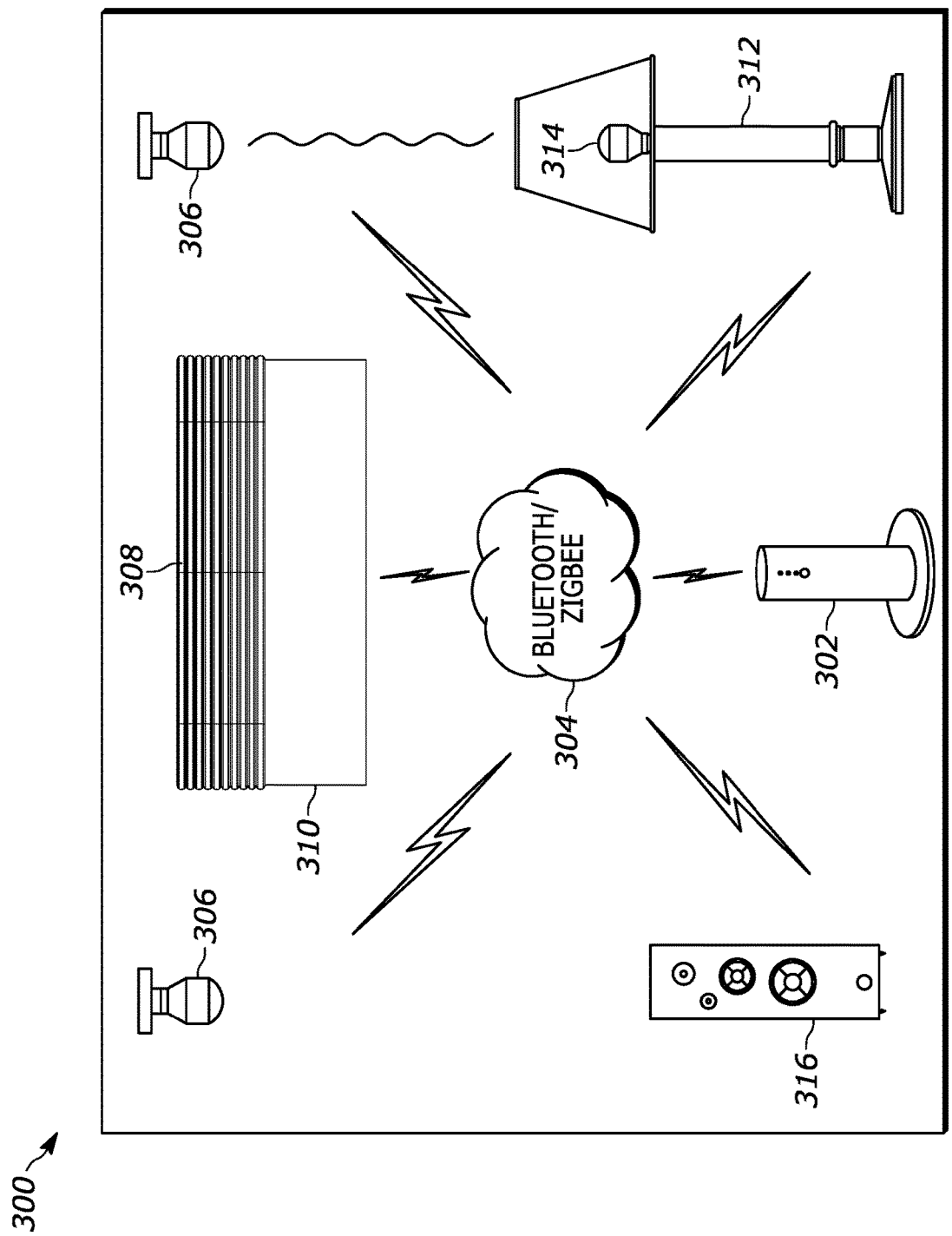
FIG. 3 is an example illustration of various Internet of things (IoT) devices communicating within a particular environment consistent with present principles.

Continuing the detailed description in reference to FIG. 3, it shows an example illustration of an IoT environment 300. It is to be understood that various IoT devices to be described below may communicate with each other and with a hub device 302 via a non-Internet/non-Wi-Fi network 304, though a secure peer-to-peer Wi-Fi network may also be used for communication in some embodiments. Also note that the hub device 302 itself may communicate with other devices outside the network 304 over the Internet and in some embodiments may even perform Internet communications on behalf of the IoT devices of FIG. 3 that will be described further below.

The network 304 itself may be a wireless Bluetooth network and/or Zigbee network for these devices to communicate through the hub device 302 and/or directly with each other peer-to-peer. Peer-to-peer communication may be performed between respective IoT devices without the communications being routed through the hub device 302 or any other device. For example, the IoT devices 314 and 316 as will be described further below may communicate directly, peer-to-peer, with each other. The hub device 302 itself may be a stand-alone digital assistant device or another device such as a laptop computer, desktop computer, tablet computer, etc.

As shown in FIG. 3, one or more ceiling-mounted IoT light bulbs 306 are present in the environment 300 and may be configured to emit light at various times of day, brightness levels, and/or colors when powered. The environment 300 may also include smart window shades 308 configured to raise and lower in order to respectively expose or cover a window 310. Additionally, the environment 300 may include a lamp 312 having an IoT light bulb 314 and a smart speaker 316. It is to be understood that each of the devices 306, 308, 314, and 316 may establish IoT devices consistent with present principles and may communicate with each other peer-to-peer consistent with present principles.

Figure 4:
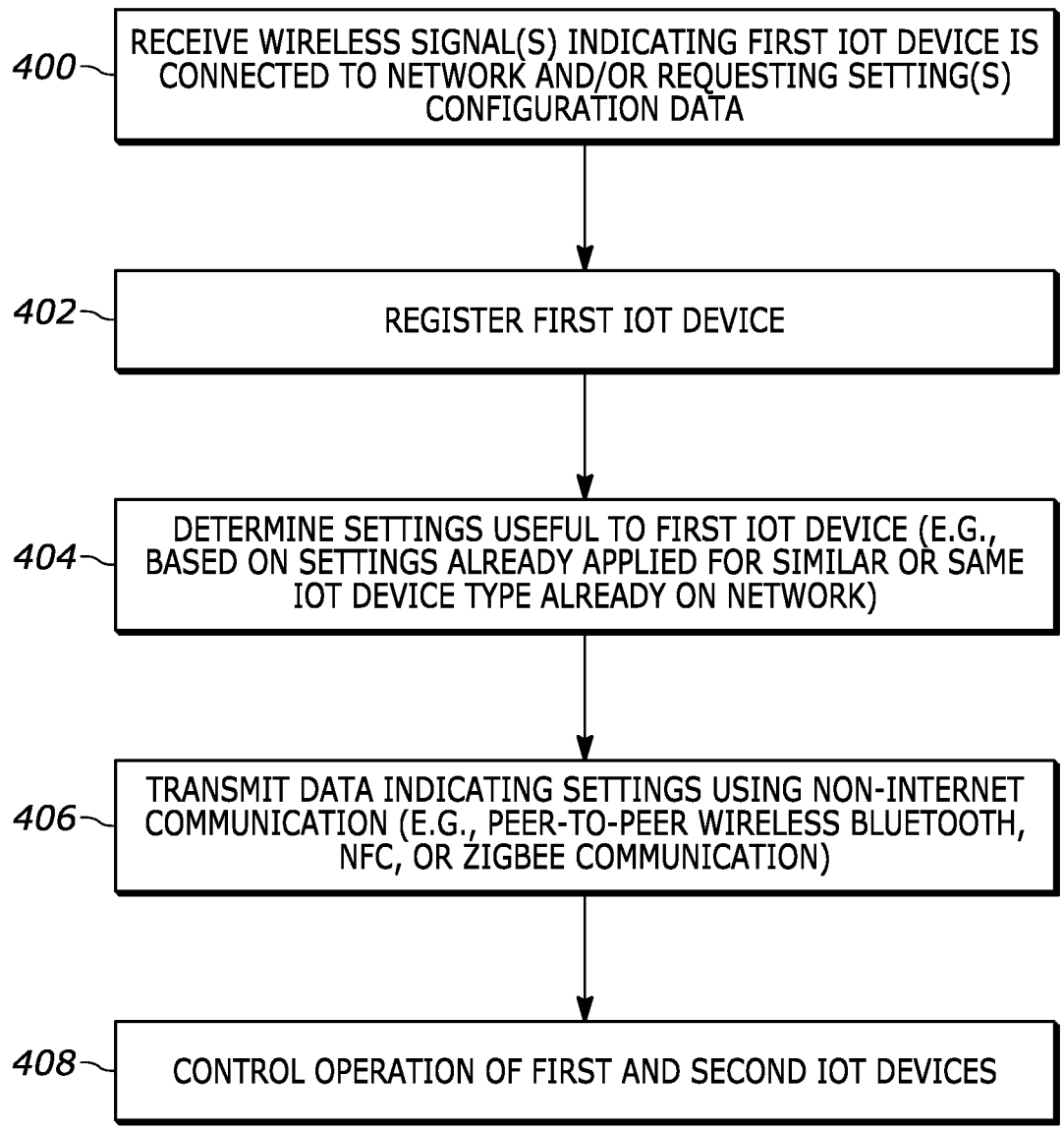

Referring now to FIG. 4, it shows example logic that may be executed by an apparatus consistent with present principles for assisting a first (new) IoT device with integration into a network and application of settings to operate the same as or complimentary to a second IoT device without contacting a device external to the network using an Internet connection vulnerable to electronic attacks and hacking. Thus, the logic of FIG. 4 may be executed by the second IoT device, the hub device 302 that coordinates amongst IoT devices on the network, or another device embodying some or all of the components of the system 100 described above. The network itself may be a Bluetooth or Zigbee network, though a secure Wi-Fi network may also be used.

Beginning at block 400, the apparatus may receive one or more wireless signals over a non-Wi-Fi/non-Internet connection such as a Bluetooth connection. The signals may indicate the first IoT device is newly connected to the network and that indicates information related to the first IoT device, such as device type, device capabilities, device location, etc. Additionally or alternatively, the received wireless signals may indicate a request from the first IoT device specifically for settings configuration data useful for configuring one or more settings of the first IoT device. The received wireless signals themselves may be received peer-to-peer directly from the first IoT device without the signals or other communications between the two being routed through a third device such as a router/modem operating the network. Thus, for example, the signals may be received peer-to-peer using Bluetooth or Zigbee communication protocols.

From block 400 the logic may proceed to block 402 where the apparatus may, if it is a hub device for example, register the first IoT device as a device with which to communicate and/or control. From block 402 the logic may then proceed to block 404 where the apparatus may determine one or more settings useful to the first IoT device based on the information received at block 400. The apparatus may do so, for example, by accessing a database stored locally at the apparatus itself indicating one or more settings that may be applied based on device type, device capabilities, device location, etc. for the first IoT device. If the apparatus is also an IoT device of the same device type as the first IoT device, the apparatus may also do so by accessing its own settings as currently configured and applied. Furthermore, in some examples even if the apparatus is not an IoT device of the same device type, the apparatus may access settings for another IoT device already registered on the network that is a same or similar device type as the first IoT device and access its settings as currently configured and applied, either as the settings are stored at the apparatus itself or as the settings are stored on the already-registered IoT device.

Then at block 406 the apparatus may transmit data indicating the determined settings to the first IoT device. The data may also be transmitted peer-to-peer directly from the apparatus to the first IoT device without the data being routed through a third device such as a router/modem operating the network. Thus, for example, the signals may be transmitted peer-to-peer using Bluetooth or Zigbee communication protocols.

From block 406 the logic then proceeds to block 408. At block 408 the apparatus may, if it is a hub device, control operation of the first IoT device as well as other IoT devices on the network, such as changing settings upon user request or upon the occurrence of another triggering event such as times of day at which IoT device operation is to occur.

Figures 5, 6:
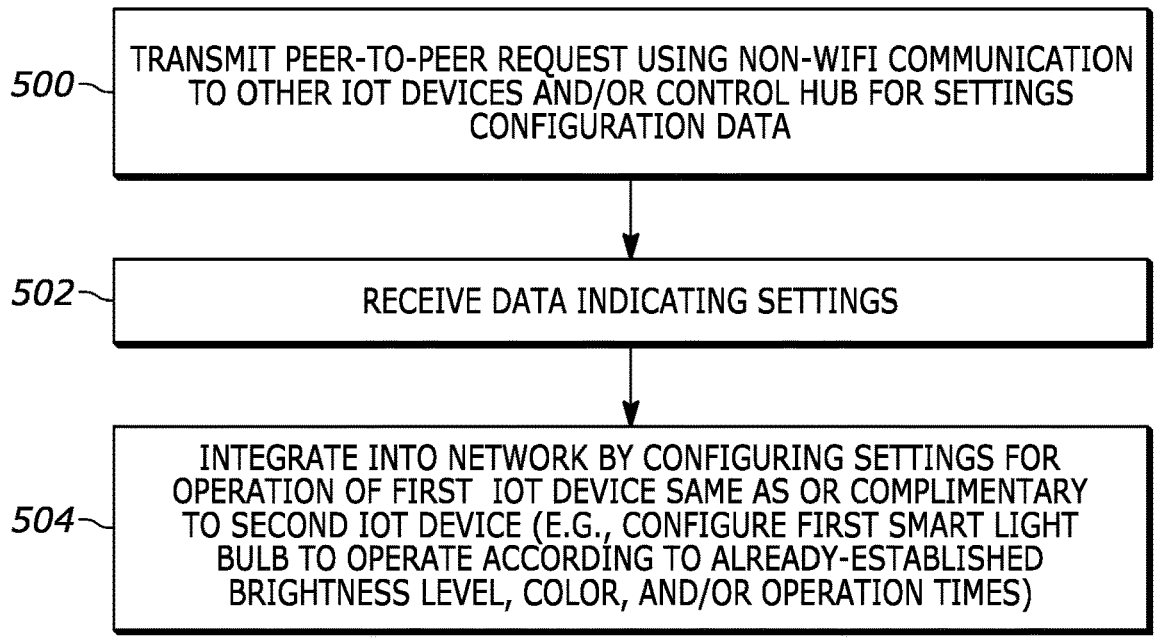

Now describing FIG. 5, it shows example logic that may be executed by the first IoT device described above in reference to FIG. 4 when it joins a network such as the network 304. At block 500, the first IoT device may transmit a peer-to-peer request for settings configuration data using non-Wi-Fi communication, such as Bluetooth or Zigbee communication. The peer-to-peer request may be a broadcast request detectable by plural other devices within range of the first IoT device.

Furthermore, the first IoT device may control power supplied to the antenna of its transceiver that is used to transmit the request so that the request is only broadcasted a threshold non-zero distance from the first IoT device (that may be less than the maximum distance that the transceiver is capable of broadcasting signals). The threshold non-zero distance may be preset by the manufacturer of the first IoT device (or a user) and may be, for example, three feet, five feet, ten feet, or another preset distance. Power to the antenna may be controlled based on data stored at the first IoT device and set by the device manufacturer that indicates an amount of power to provide to the antenna for transmission of the request based on the threshold distance so that the range at which the request is receivable by other devices matches or is close to matching the threshold distance. A power regulator within the first IoT device may be used for actually controlling the amount of power provided to its antenna.

It being understood that in at least some examples a personal area network such as a Bluetooth or Zigbee network cannot extend through walls of a building, the threshold non-zero distance may be used to minimize additional risk of the first IoT device inadvertently transmitting the request and thus possibly receiving responsive communications from other devices outside the particular environment in which the first IoT device is disposed if those other devices are not separated from the first IoT device by a wall, if they are in an open-air area, if signals from the first IoT device can travel through a window or down a hallway, etc. For example, the threshold non-zero distance may be used so that the first IoT device does not inadvertently communicate with IoT devices in a different residence than the one in which the first IoT device is disposed (that might have settings preferences for another user other than the user of the first IoT device), or even in a different room of the same residence since IoT devices of the same type may still be configured differently based on the room in which they are located (e.g., to conform to different user preferences of the same user but for the different rooms).

Additionally, note that the same principles regarding regulation of power to the antenna may be used by an IoT device already communicating over the network so that it does not inadvertently transmit its own settings configuration data to other devices outside of the environment in which it is disposed. Thus, any such IoT device already communicating over the network may also control power to its own transceiver antenna to not transmit its settings configuration data beyond the same or a different threshold distance.

From block 500 the logic may then proceed to block 502. At block 502 the first IoT device may receive data back from one or more devices that received the broadcast request, such as a second IoT device, with the data indicating settings already applied at the second IoT device consistent with present principles. The data may be received peer-to-peer using non-Wi-Fi communication, such as Bluetooth or Zigbee communication.

From block 502 the logic may then proceed to block 504 where the first IoT device may integrate into the network at least in part by configuring its settings to operate the same as or complimentary to the second IoT device. For example, the first and second IoT devices may both be smart light bulbs disposed in the same room of a personal residence, and therefore the first IoT device may apply already-established settings received from the second IoT device so that the settings for both devices match and hence both IoT devices operate the same in terms of, e.g., brightness level, color, and times of operation.

However, in situations where the first and second IoT devices are not devices of the same device type (or even same device model), the first IoT device may receive the data indicating the settings already applied at the second IoT device and then access a relational database stored locally at the first IoT device itself to determine one or more complimentary settings to apply at the first IoT device based on the received data indicating the second IoT device's settings. The relational database may have been configured and stored at the first IoT device by the device's manufacturer so that the first IoT device need not access the database over an Internet connection that might leave the first IoT device or other devices on the network susceptible to electronic attack. Additionally or alternatively, the relational database may be stored at a hub device such as the device 302 and then made accessible to IoT devices peer-to-peer, e.g., using Bluetooth or Zigbee communication. Two examples of relational databases that may be used consistent with present principles will be described below in reference to FIGS. 6 and 7.

Beginning first with FIG. 6, a database 600 is illustrated as having a column 602 indicating a particular parameter, a column 604 indicating how the parameter is to be applied for a light bulb IoT device, a column 606 indicating how the parameter is to be applied for a complimentary window shade IoT device, and even a column 608 indicating one or more time frames during which the parameter is to be applied. Now suppose that the first IoT device that is to have its settings configured is in fact a window shade IoT device and that settings for a smart light bulb are received at block 502. Discussing a few examples from the database 600, should the user have already configured the smart light bulb to emit a yellow color, the first IoT device may locate this parameter in the first row for column 602 and/or locate "yellow" in column 604 and then move over to column 606 for that row to identify that the first IoT device's settings may be configured so that the first IoT device (smart window shades) may be configured in the open or partially open position from sun up to sun down (or from 6:00 a.m. to 6:00 p.m. for example) as indicated in column 608. Sun up and sun down may be determined based on calendar data indicating sun rises and sunsets, as may be stored at the first IoT device or a hub device in communication with it.

As another example, should the user have configured the smart light bulb to emit a blue color (e.g., from 7:01 p.m. to 6:59 a.m.), the first IoT device may locate this parameter in the second row for column 602 and/or locate "blue" in column 604. The first IoT device may then move over to column 606 for that row to identify that the first IoT device's settings may be configured so that the first IoT device is placed in or remains in the closed position from 7:01 p.m. to 6:59 a.m. per column 608, or at least during operation of the smart light bulb while it emits a blue color as may be determined based on communication with the smart light bulb itself (e.g., if no time were specified in column 608).

Discussing a few other examples, should the user have configured the smart light bulb to be powered on during evening hours or even during a specified evening time frame of 8:00 p.m. to 5:00 a.m. as may be indicated in column 608, the first IoT device may use the third row to determine that the first IoT device should configure its shades to be open or partially open while a half to full moon is occurring during evening hours (or the specified time frame from column 608), as may be determined based on calendar data indicating moon phases as may be stored at the first IoT device or a hub device in communication with it. Additionally, as also indicted in FIG. 6, should the user have configured the smart light bulb to lend to an ambient room brightness of level five at all times, the first IoT device may dynamically operate its shades to a more open or closed configuration to provide more or less ambient light, respectively, based on input from a light sensor on the first IoT device or the hub device so that current ambient light matches light level five based on light from the window and light from the bulb combined.

Now describing FIG. 7, it illustrates yet another example database 700. The database 700 may have a column 702 indicating a particular parameter, a column 704 indicating how the parameter is to be applied for a wireless speaker, and a column 706 indicating how the parameter is to be applied for televisions speakers. Discussing the first example row, the first parameter may relate to volume that is to be applied at a level five for wireless speakers as shown in column 704 and at a level zero for TV speakers when the wireless speakers are in use.

Discussing the second example row, the second parameter may also relate to volume. The volume that is to be applied for this row may be level six for TV speakers as indicated in column 706 when no wireless speakers are in use, powered on, or connected to the network (as may be identified by the first IoT device based on communication or non-communication with other devices, including any potential wireless speakers, over the network).

Providing one more example in relation to FIG. 7, for the third example row the third parameter may relate to treble level that is to be applied. Here the same treble level may be common to and hence applied to both the wireless speakers and TV speakers, which in this example is a treble level of five. Thus, it is to be more generally understood that a common treble level may be applied across various speakers of different speaker types based on a user configuring one treble level for only one speaker, even if not all other settings for the respective wireless speakers and TV speakers are to be configured identical.

Now describing FIG. 8, it shows an example graphical user interface (GUI) 800. The GUI 800 may be presentable on an electronic display controllable by a hub device, a user's smart phone, or even an IoT device itself for configuring settings of the IoT device which may then be transmitted to other IoT devices for configuration of their own settings the same as or complimentary to the first IoT device. In the example shown, the IoT device being configured is a smart light bulb and the GUI 800 may include various color options 802 for the light bulb that may be selected by directing touch or cursor input to the respective check box shown adjacent to the respective option 802. Example options include white colored light and yellow colored light, and in the example shown the last option 802 (the "other" option) may include a selector 804 that is selectable to cause presentation of a drop-down menu from which still other colors may be selected.

The GUI 800 may also include a setting 806 to configure a brightness level for the smart light bulb. This may be done by directing input of a particular integer to input box 808 on the scale of one to ten for brightness.

Still further, the GUI 800 may include a setting 810 to configure one or more times at which the smart light bulb is to operate to emit light. A start time for operation may be specified by a user by directing input to input box 812 to specify the start time, while an end time for operation may be specified by the user by directing input to input box 814 to specify the end time.

Additionally, in some examples the GUI 800 may also include an option 816 that is selectable by directing touch or cursor input to the adjacent check box. The option 816 may be selected to configure or enable the first IoT device to make the settings configured using the GUI 800 available to other devices, should the first IoT device receive such as request such as at block 400 of FIG. 4 as described above. Thus, in this example should the check box for the option 816 not be checked by the user, the first IoT device may not transmit its settings configuration data peer-to-peer to a requesting device.

Figure 9:

FIG. 9 shows yet another example GUI 900. The GUI 900 may be used to configure one or more settings of an IoT device network. Each of the options to be described below may be selected based on selection of the respective check box shown adjacent to the respective option.

It may be appreciated from FIG. 9 that a first option 902 may be provided. The option 902 may be selected to enable or permit IoT devices operating on the network to communicate peer-to-peer using a non-Wi-Fi communication protocol such as Bluetooth or Zigbee communication for configuration of the same or complimentary settings consistent with present principles. Thus, based on selection of the first option 902, a coordinating device such as the hub device 302 described above may transmit commands to each IoT device already communicating with the hub device 302 over a network to configure those IoT devices to allow a new IoT device to acquire settings from those IoT devices peer-to-peer when joining the network. Additionally or alternatively, based on selection of the first option 902 the coordinating device may transmit commands to the existing IoT devices to simply enable the existing IoT devices to communicate with other IoT devices peer-to-peer using a given communication protocol (e.g., Bluetooth). The coordinating device may even self-detect what communication protocols each IoT device on the network may support via plug and play (PnP) protocols for such purposes.

Options 904 and 906 may also be selected to configure the coordinating device and/or each IoT device already communicating over the network to specifically use either Bluetooth communication or Zigbee communication for peer-to-peer settings configuration data transfers consistent with present principles.

Still further, as an added layer of security an option 908 may be presented. The option 908 may be selected to configure the coordinating device and/or each IoT device already communicating over the same network to never use Internet and/or Wi-Fi communication to communicate with other IoT devices, and/or to disable their respective Wi-Fi transceivers altogether. However, note that the IoT devices may still communicate with each other using other wireless protocols even when the option 908 is selected, such as using Bluetooth or Zigbee communication.

FIG. 9 also shows that an option 910 may be presented for a user to configure a threshold distance as mentioned above at which one or more IoT devices already communicating over a network may broadcast their settings configuration data to new IoT devices as the new IoT devices connect to the network, should the user wish to use a different threshold distance than one that might have been set by the device's manufacturer. Thus, input of a distance may be directed to input box 912 for the end user to establish a preferred threshold distance for an IoT device to transmit its settings configuration data, which may then be used by the existing IoT devices to then transmit their respective settings configuration data upon request from a new IoT device.

Moving on from FIG. 9, it is to be generally understood consistent with present principles that settings configuration data may be transferred to a new IoT device joining a network upon a pull request from the new IoT device. However, in addition to or in lieu of that, a push transmission of the data from an existing IoT device to the new IoT device may also occur upon the existing IoT device detecting the new IoT device coming online to the network.

It may now be appreciated that present principles improve the functionality of the devices disclosed herein as well as the ways those devices may operate. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus comprising a coordinating device, the apparatus comprising:
   at least one processor; and
   storage accessible to the at least one processor and comprising instructions executable by the at least one processor to:
   present a graphical user interface (GUI) on a display, the GUI being usable to configure one or more settings related to a network, the GUI comprising an option that is selectable by an end user a single time to enable the coordinating device to transmit commands to Internet of things (IoT) devices already communicating with the coordinating device to configure the IoT devices already communicating with the coordinating device to communicate peer-to-peer using non-Wi-Fi communication for configuration of settings of one or more new IoT devices joining the network;
   identify a first IoT device as being connected to the network;
   detect, using one or more discovery protocols, one or more communication protocols that the first IoT device supports for communication with other devices; and
   responsive to the identification and the detection and based on selection of the option, transmit data to the first IoT device for integration of the first IoT device into the network, the data indicating one or more settings already applied at a second IoT device different from the first IoT device.

2. The apparatus of claim 1, wherein the apparatus comprises the second IoT device, and wherein the second IoT device transmits the data to the first IoT device via peer-to-peer wireless communication and without the second IoT device communicating with any other device to access the data, the data stored locally at the second IoT device.

3. The apparatus of claim 1, wherein the GUI comprises an element at which a threshold distance is specifiable by the end user, the threshold distance defining a maximum distance that the data will be transmitted by each respective IoT device already on the network to provide the respective IoT device's settings configuration data to one or more other IoT devices joining the network.

4. The apparatus of claim 1, wherein the option is a first option, and wherein the GUI comprises a second option that is selectable to command each respective IoT device already on the network to disable the respective IoT device's Wi-Fi transceiver and instead communicate using a different transceiver.

5. The apparatus of claim 1, comprising the display.

6. The apparatus of claim 5, comprising at least one network transceiver useable to communicate over the network.

7. The apparatus of claim 1, comprising at least one network transceiver useable to communicate over the network.

8. A method, comprising:
   presenting a graphical user interface (GUI) on a display of a coordinating device, the GUI being usable to configure one or more settings related to a network, the GUI comprising an option that is selectable by an end user to enable the coordinating device to transmit commands to Internet of things (IoT) devices already communicating with the coordinating device to configure the IoT devices already communicating with the coordinating device to communicate peer-to-peer using non-Wi-Fi communication for configuration of settings of one or more new IoT devices joining the network;
   identifying a first IoT device as connecting to the network;
   detecting, using one or more discovery protocols, one or more communication protocols that the first IoT device uses for communication with other devices; and
   responsive to the identifying and the detecting and based on selection of the option, transmitting data to the first IoT device that indicates one or more settings already applied at a second IoT device different from the first IoT device.

9. The method of claim 8, wherein the one or more settings are one or more first settings, and wherein the data is used to determine one or more second settings for operation of the first IoT device complimentary with operation of the second IoT device.

10. The method of claim 9, wherein the one or more second settings for operation of the first IoT device complimentary with operation of the second IoT device are determined based on accessing data in a relational database indicating complimentary settings.

11. The method of claim 8, wherein the data is transmitted by the second IoT device, and wherein the GUI comprises an element at which a threshold distance can be specified by the end user, the threshold distance defining a maximum distance that the data will be transmitted by the second IoT device, wherein the maximum distance that the data will be transmitted by the second IoT device is less than the maximum distance that the second IoT device is capable of transmitting the data.

12. The method of claim 8, wherein the option is a first option, and wherein the GUI comprises a second option that is selectable to command the first IoT device to disable its Wi-Fi transceiver and instead communicate using a different transceiver.

13. At least a first device comprising a coordinating device, the at least first device comprising:
 at least one processor; and
 storage accessible to the at least one processor and comprising instructions executable by the at least one processor to:
 present a graphical user interface (GUI) on a display, the GUI being usable to configure one or more settings related to a network, the GUI comprising an element at which a threshold distance is specifiable by an end user, the threshold distance defining a maximum distance that settings configuration data will be transmitted by one or more Internet of things (IoT) devices already on the network to one or more other IoT devices joining the network;
 use one or more discovery protocols to determine which communication protocol(s) a second device joining the network supports for communication with other IoT devices; and
 based on the determination, transmit first data within the threshold distance and to the second device for integration of the second device into the network, the first data indicating one or more settings already applied at another IoT device.

14. The at least first device of claim 13, wherein the GUI is a first GUI, and wherein the instructions are executable to:
 present a second GUI, the second GUI being usable to configure one or more settings of the second IoT device, the second GUI comprising an option that is selectable by the end user to configure the second IoT device to make the second IoT device's settings available to other IoT devices in the future upon request.

15. The at least first device of claim 13, comprising a Wi-Fi transceiver accessible to the at least one processor, wherein the instructions are executable to:
 receive a command from the coordinating device to disable the Wi-Fi transceiver and instead communicate using a different transceiver; and
 based on receipt of the command, disable the Wi-Fi transceiver and communicate using the different transceiver.

16. The at least first device of claim 13, wherein the GUI comprises an option that is selectable by the end user to enable the coordinating device to transmit commands to IoT devices already communicating with the coordinating device to configure the IoT devices already communicating with the coordinating device to communicate peer-to-peer using non-Wi-Fi communication for configuration of settings of one or more new IoT devices joining the network.

17. The at least first device of claim 13, comprising the display.

18. The at least first device of claim 17, comprising at least one network transceiver useable to communicate over the network.

19. The at least first device of claim 13, comprising at least one network transceiver useable to communicate over the network.

20. The at least first device of claim 13, comprising the second device, and comprising a respective network transceiver on each of the first and second devices, the respective network transceivers being useable for communication between the first and second devices over the network.

* * * * *